United States Patent

[11] 3,562,426

[72] Inventor  Jean Lavergne
              Epinay-sur-Orge, France
[21] Appl. No. 717,344
[22] Filed     Mar. 29, 1968
[45] Patented  Feb. 9, 1971
[73] Assignee  C.I.T.-Compagnie Industrielle
               des Telecommunications,
               Paris, France
[32] Priority  Apr. 4, 1967
[33]           France
[31]           101,497

[54] FACSIMILE SCANNER WITH ROTATING
     OPTICAL FIBER AND OPTICAL CORRECTION
     17 Claims, 8 Drawing Figs.
[52] U.S. Cl. .......................................... 178/7.6,
                                       178/6, 178/7.1
[51] Int. Cl. ........................................... H04n 1/04
[50] Field of Search ............................. 178/6LCR,
                               7.1, 7.6; 250/199 (Cursory)

[56]            References Cited
            UNITED STATES PATENTS
RE21,105  5/1939   Round ......................   178/7.1
3,036,153  5/1962  Day ..........................   178/7.1
3,210,462 10/1965  Trott ........................   178/6LCR
3,256,443  6/1966  Moore ......................   250/199
3,277,772 10/1966  Atwood ....................   178/7.6
3,345,460 10/1967  Betts ........................   178/7.6
3,401,232  9/1968  Goldhammer .............   178/7.1

Primary Examiner—Robert L. Richardson
Assistant Examiner—Howard W. Britton
Attorney—Craig, Antonelli, Stewart & Hill ABSTRACT: Facsimile apparatus wherein a mark on a flat document is correlated with an electrical signal through an optical link comprising essentially a wide angle objective lens projecting an image from said document on a first plane mirror, a cylindrical surface receiving said image from said first plane mirror, at least one optical fiber rotating about the axis of said cylindrical surface with an extremity close to said surface, a second plane mirror receiving an image from said optical fiber and an electro-optical device detecting the image from said second plane mirror.

{ 3,562,426 }

FACSIMILE SCANNER WITH ROTATING OPTICAL FIBER AND OPTICAL CORRECTION

The invention relates to the reproduction of a document by means of light rays for the purpose of electrical transmission and more particularly as a facsimile, wherein the document is presented for reproduction and transmission in the flat state and is also reproduced after receipt in the flat state.

There are already known light analysis devices for documents presented in the flat condition and operating by means of a slot parallel to one line of the document and an opaque drum, with its axis parallel to the slot, carrying a helicoidal transparent trace for scanning the line and equipped on the inside with a photoelectric cell which supplied electrical signals, corresponding to the content of an analyzed line, as the drum turns about its axis. For analyzing a document presented in the flat state, there are also arrangements in which a slot placed along one line of the document cooperates with a rotating disc, having either a helical slot or several radial slots therein. Further more, there is also known an analyzing device for a flat document which provides a pencil of light for exploring the document line by line by means of a mirror reflecting a light beam derived from a light source and moving pivotally under the action of a suitable cinematic device.

All these arrangements have the drawback of providing poor definition and of having a limited scanning speed, which is a serious defect in modern transmission techniques with high-speed transmission characteristics.

On the other hand, for reconstituting the document in facsimile at the reception, it is known to use a stylus resting on carbon paper, which makes a corresponding trace according to the valence of the received signals. Other apparatus use a chemically treated paper which is discolored under the action of a current passing through the apparatus as a function of the valency of the received signals. In yet other appliances, an electrostatic charge image is formed on an insulating base by means of a head subjected to a voltage as a function of the signal valency. This image is powered by means of a powder containing a magnetic constituent, and the powdered image is used for transferring the powder to a paper. All these methods provide reproduction based on the use of a revolving drum.

The invention has the object of facilitating the analysis of a flat document during the transmission and reproduction on a flat support for reception with good definition and at high speed.

According to the invention, a device serving either for the analysis of a flat document at the transmission end of a facsimile link, or provided at the receiving end of such a link for reproducing the same, comprises essentially, and in functional relationship, optical means for converting a horizontal line to a cylindrical image on a part of a cylinder having a vertical axis or vice versa, and mechanical means for moving an end of at least one optical fiber along the outer wall of the said cylinder, said fiber being bent back in the manner of a hook so as to present its cross section parallel and in optical contact with the said cylindrical image, and whose other end is aligned with the axis of the cylinder and has its cross section disposed in optical contact with an electro-optical member.

At one transmission end, the image of a line of a flat document is formed on the said cylindrical surface, where it is "read" by at least one rotating optical fiber which applies the light signals to an electro-optical member, for example, a photomultiplier tube, which transmits the electrical signals to a transmission amplifier. The document which advances in the perpendicular direction by intervals corresponding to a line, can therefore be analyzed line by line.

At the receiving end, the electrical signals coming from a line amplifier modulate the intensity of a light beam formed by means of an electro-optical member, such as a Kerr cell or the like, the modulated beam is passed through a rotating optical fiber whose one end describes a cylindrical trajectory, and the cylindrical image thus formed is applied in the form of a line by the optical arrangement to photosensitive paper. The photosensitive paper advances perpendicularly by spaces equal to line intervals, and the transmitted document may be thereby received line by line.

The will be further explained with reference to the accompanying drawings which illustrate the invention, but in no restrictive manner.

Figure 1:
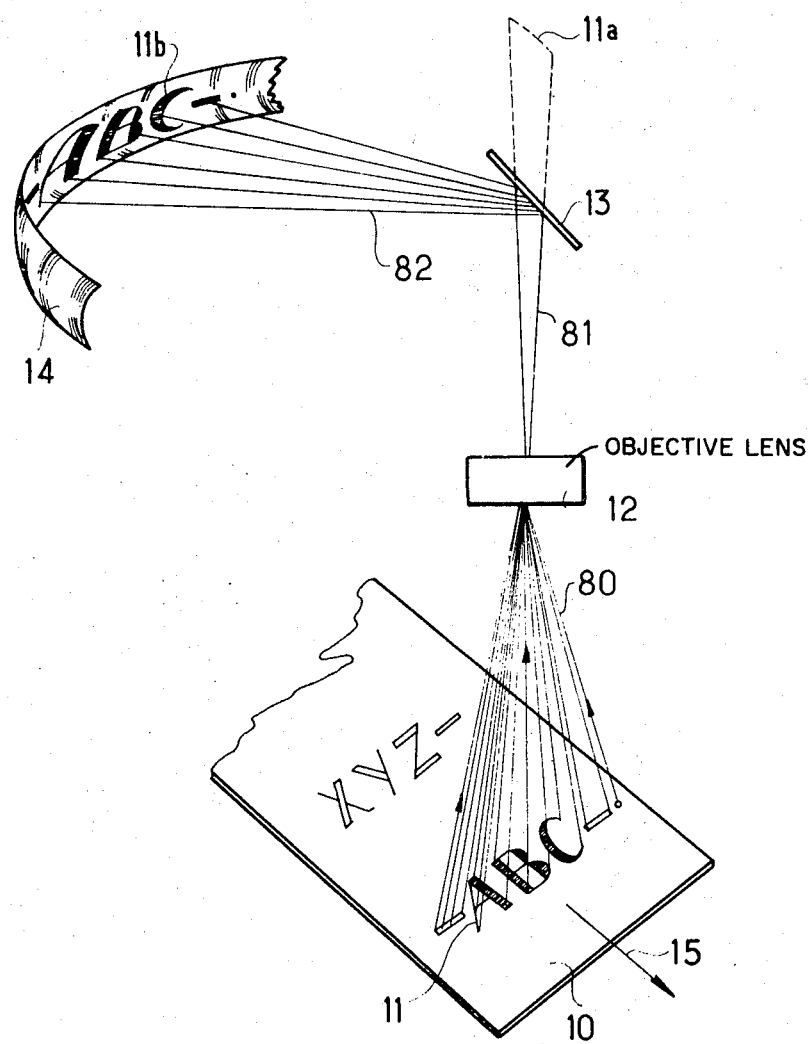
FIG. 1 is a schematic diagram of a part of the optical transmission arrangement in accordance with the invention.

In the drawings, the same reference numerals are used to designate the same elements throughout the views wherever possible. FIG. 1 is a schematic diagram, showing how a line of letters 11 of a document 10, which may be displaced in its plane along the direction of arrow 15, may be transmitted (rays 80) to a suitable objective lens 12 having spherical lenses, which passes the image (rays 81) to a flat mirror 13 for reflection (rays 82) as a spherical virtual image 11a, which is transmitted by the said mirror 13 in the form of a real image 11b, received by a screen 14 of suitable shape.

The manufacture of an objective lens 12, supplying an image in the form of a spherical segment from a flat object, presents no difficulties from the viewpoint of optical design. For example, it is possible to use an objective lens of known type, namely a simplified, so-called "wide angle" lens, which is in some way "degenerated"; such "wide angle" lenses are well known in photography and comprise correcting elements which give, with a view to obtaining a wide angle of, say, 90°, a flat image, which can be received on a photographic plate. For very wide angles, for example, 120° and more, the complete correction is no longer possible, and the image produced is in the form of a cylindrical band, received on a photosensitive support of the same shape. In this case, the correction is useless and the wide angle objective lens without correction gives a spherical image. It is this type of image-forming arrangement which is directly utilized in accordance with the invention. The effectively used spherical segment is very narrow and the image can, in fact be assimilated on one part of a cylindrical surface.

Figure 2:
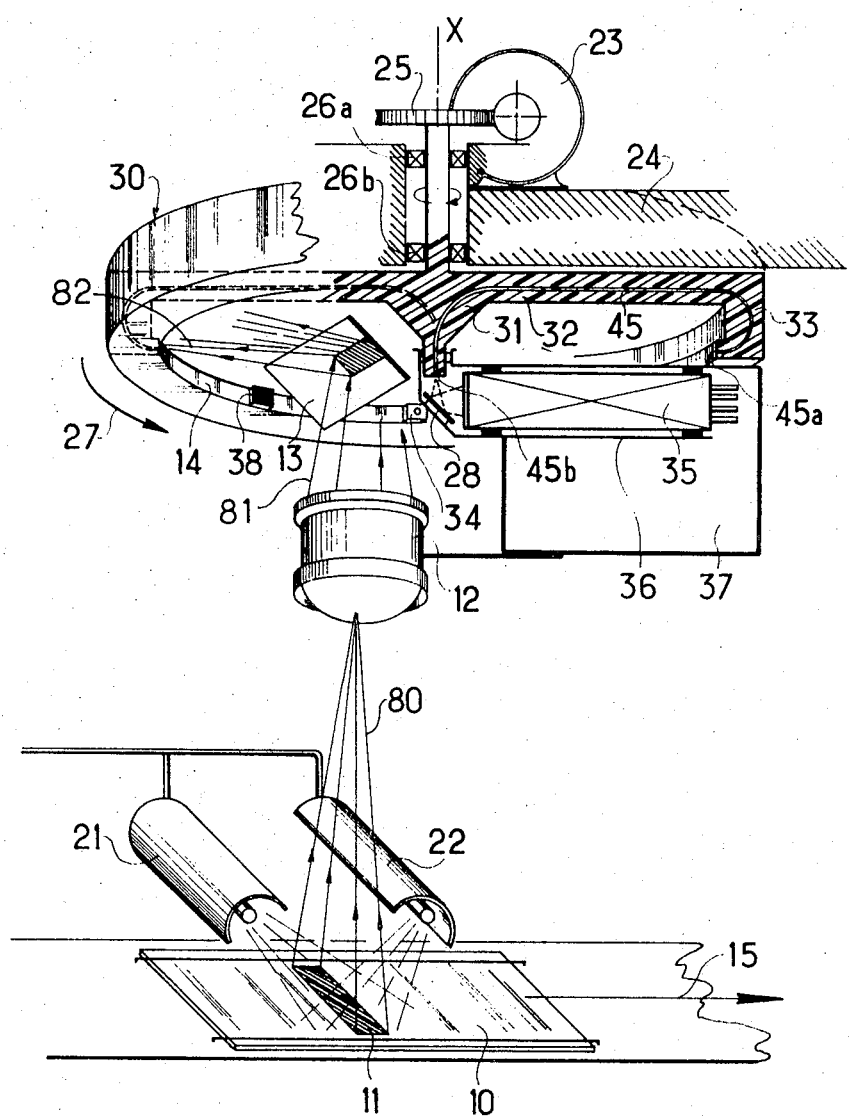
FIG. 2 is a view in perspective partially in cross section of an embodiment of a transmission assembly based on the arrangement of FIG. 1.

In FIG. 2, a small number of optical fibers, such as fiber 45, for example eight in number, are spaced by 45° in a revolution member 30 having the shape of a disc, formed substantially by a central core 31 having an axis X, a leg 32 and a flange 33 bent back parallel to the axis X in the same direction as the core 31. At each point of the flange 33 occupied by the optical fibers, the flange 33 has a small projection 34 turned towards the axis X.

A fiber such as 45, inserted into the cart 30, has a portion parallel to the axis X in the core 31, a second portion perpendicular to the axis X in the leg 32 connected to the first portion by a curved section or elbow, and a portion in the flange 33 which is bent back with an end 45a terminating in a projection 34 and turned towards the axis X. A projection such as 34 may be covered with an opaque cover 38.

Opposite the other end 45b of the fiber 45, that is facing the core 31, a mirror 28, inclined advantageously at 45°, transmits the light rays coming from the optical fiber 45 in the vertical direction and reflects them horizontally. The direction of these rays passes through the window of a photosensitive member, for example, a photomultiplier 35, mounted in a box which is opaque to light, and connected to an electrical amplifier (not shown) housed in a compartment 37. The output of this amplifier may be connected to an apparatus for forming and using the electrical signals, not shown in the drawing.

The disc 30 is driven in rotation, for example, in the direction of the arrow 27, by a motor 23 mounted on a frame 24, by means of gearing 25 mounted on a drive shaft of the disc supported in bearings 26a and 26b.

The document to be analyzed is illuminated by light sources 21 and 22. The objective lens 12, receiving the rays 80, forms a spherical image (rays 81) from a line 11 which is transmitted by a plane mirror 13 to a screen surface 14 (rays 82), formed by the inner circumferential surface portions of the flange 33 between the projections, such as 34.

Figure 3:
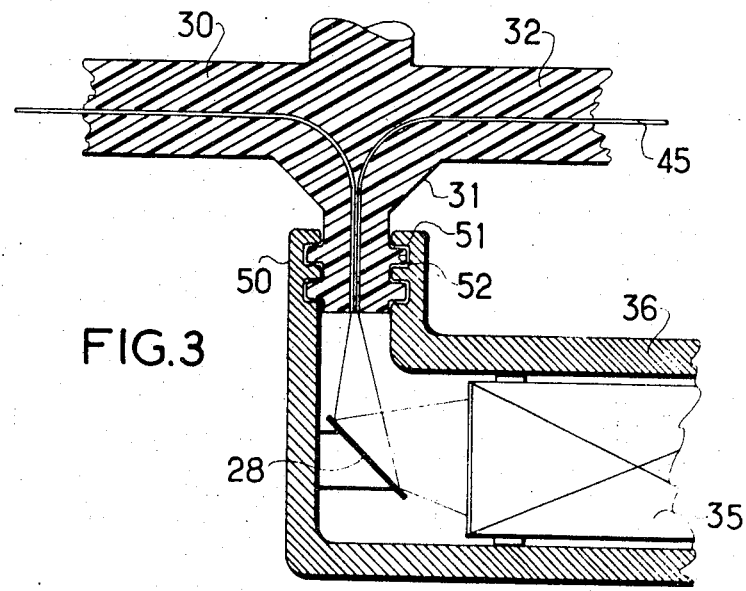
FIG. 3 is a cross section on a larger scale of a portion of the device of FIG. 2.

As shown in FIG. 3, in order to prevent the impingement of parasitic light on the photomultiplier tube 35, there is arranged between the box 36 containing the tube, and the core 31 of the disc 30, a light trap 50, formed by recesses in the core 52 engaging with corresponding projections 51 of the box to form a serpentine path therebetween.

Figure 4:
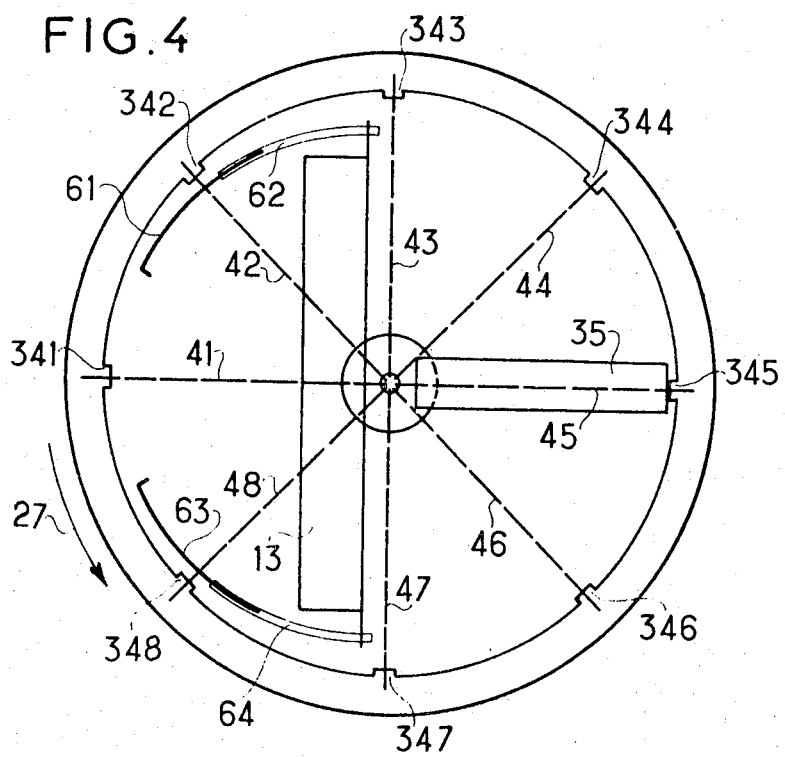
FIG. 4 is a plan view of a part of the device of FIG. 2, viewed from below.

FIG. 4 shows in plan view diagrammatically, an arrangement of eight optical fibers 41 to 48, terminating in projections 341 to 348, respectively. The angular portion scanned by the fibers is limited by two screens 61 and 63, which have the shape of cylindrical surfaces, and the angular portion scanned can be adjusted in length by moving the screens more or less in respective guides 62 and 64.

Figure 5:
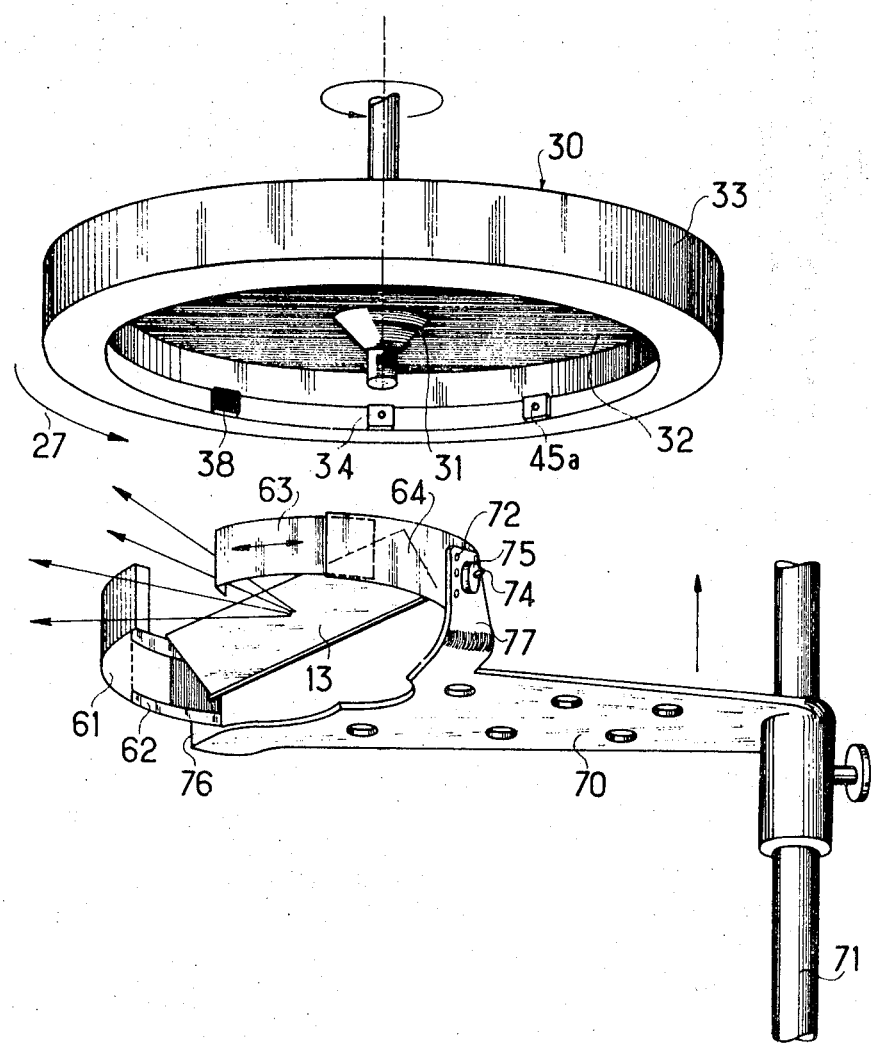
FIG. 5 is an exploded view of a part of the device of FIG. 2.

In FIG. 5 it is seen that the mirror 13, the screens 61 and 63 and their guides may preferably form a mechanical unit, mounted on an arm 70 whose one end is bent back to form a U-shaped flange. The legs 76 and 77 of this flange carry the guides 62 and 64, mounted thereon by means of rivets 72. The mirror 13 is fixed on a spindle 74 having threaded end which is secured to the flange by means of screws 75. The arm 70 is mounted on a support 71, which may advantageously be integral with the frame 24.

The operation of the arrangement is as follows: the cylindrical image of a "section" of the document is received by a projection 341 which contains the end of an optical fiber 41 (FIG. 4). This portion is "read" by the fiber 41 during its movement between the edge of a screen 61 and the edge of a screen 63 during the rotation of the disc 30 in the direction of the arrow 27. When the next fiber 42 enters in its turn into the zone between the two screens, the document which advances along the arrow 15 (FIG. 1) presents a second section adjacent to the first one, and this continues. This condition is assured by the relation between the translation speed of the document 10 and the speed of rotation of the disc 30. More particularly, these two movements may be generated by a single motor by means of suitable cinematic device, not shown.

For a rotational speed of the disc of 50 revolutions per second, with eight optical fibers 41 to 48 in the disc, one obtains an analysis speed of 400 lines per second. With a definition of 800 points per line, for a line of 24 cm. length with a fiber diameter of 0.3 mm., the corresponding transmission velocity is 320,000 bands.

The width of the format may be doubled by doubling the angular width of the aperture between the two screens 61 and 63 by pushing them back in their respective guides 62 and 64. At the same time, four projections, for example, 342, 344, 346 and 348 are obscured by covering the ends of these fibers of even number, i.e., 42,...48, with caps. The odd number fibers 41,...,47 remain operative. This provides an exploration with four fibers, at a speed of 200 lines per second, but the lines have here a double length with 1,600 points per line, and the transmission speed remains the same as above.

Figure 6:
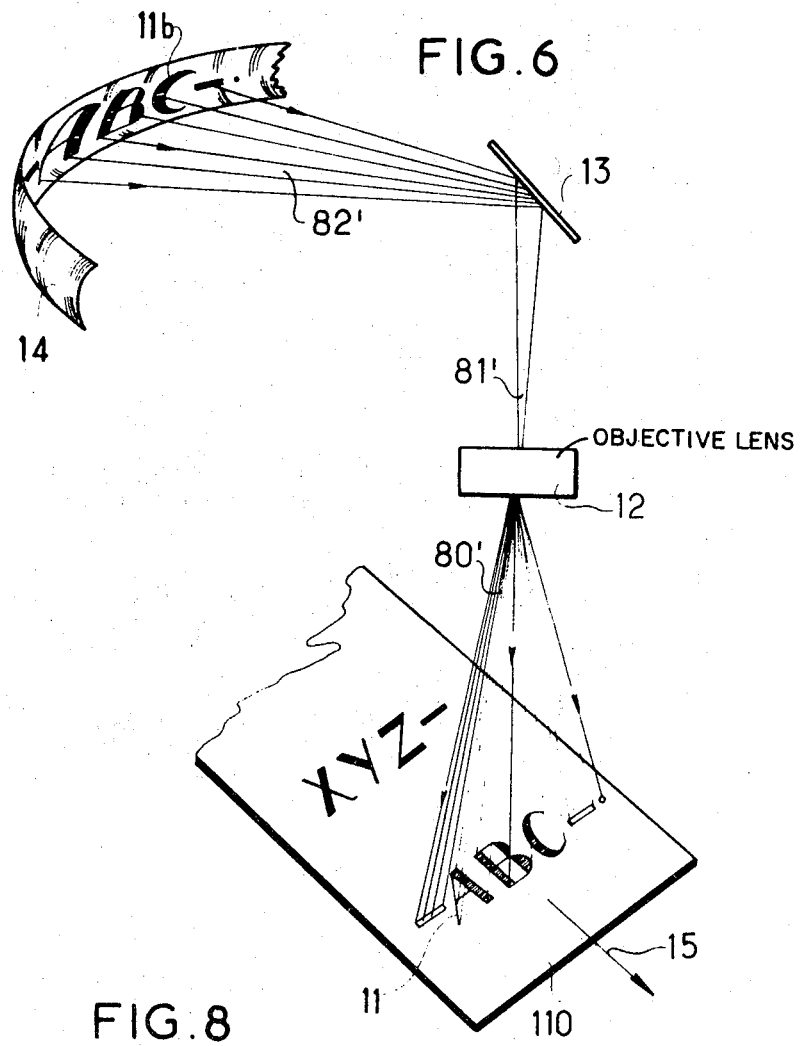
FIG. 6 is a schematic diagram of a part of the optical receiving arrangement in accordance with the invention corresponding to FIG. 1.

FIG. 6 which corresponds to the reverse travel of the rays compared with FIG. 1, shows how a text 11b made to appear on the inner surface of a screen 14 and projected by a mirror 13 onto an objective lens 12 of the "wide angle" type, is recreated by the objective lens in the shape of a straight line 11 on a photosensitive paper 110, which moves in the direction of arrow 15 (light rays 82', 81', 80').

Figure 7:
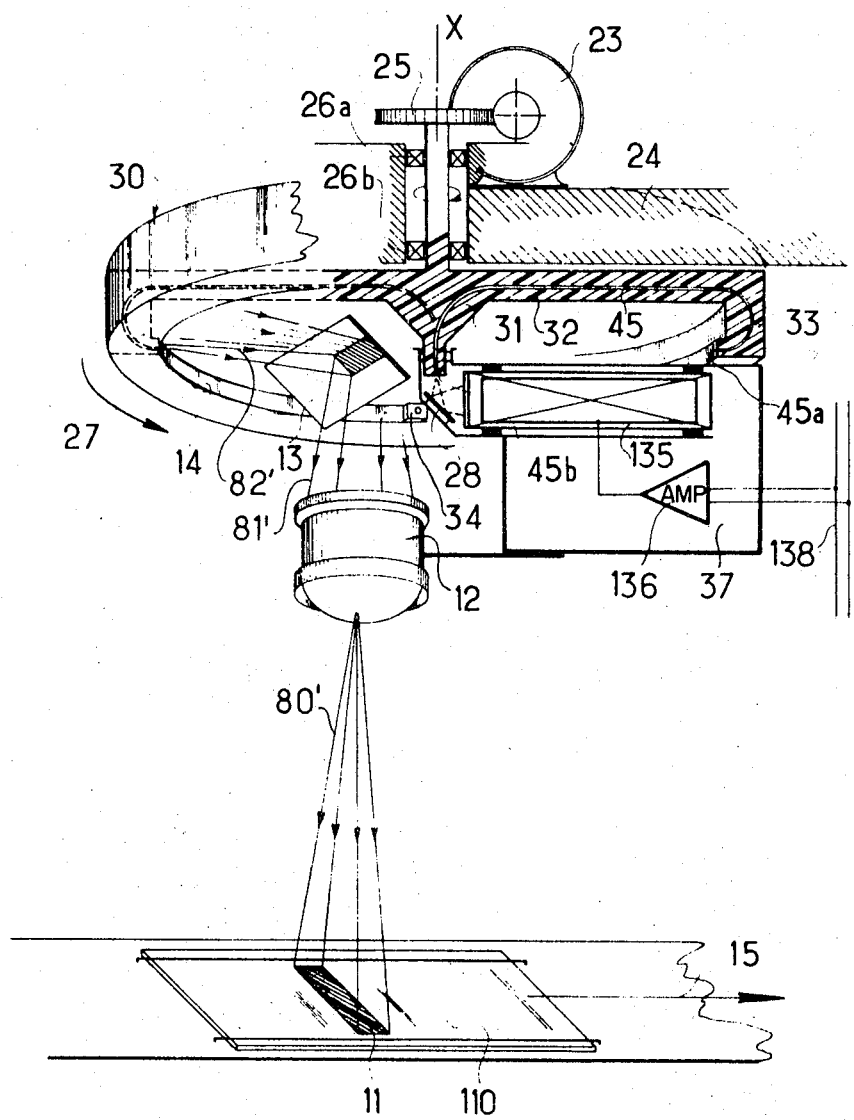
FIG. 7 is a view in perspective partially in section of the receiving device based on the arrangement of FIG. 2.

In FIG. 7, there is arranged opposite the end 45b of the optical fiber 45, i.e., opposite the core 31, a mirror 28 which is preferably inclined at 45° and transmits vertically towards the optical fiber 45 the light rays which arrive horizontally from a light modulating device 135 which effects a modulation of the intensity of the output beam of a light source affected by an electric voltage supplied by an amplifier 136, connected to one end of a transmission line 138. The light transmitted to the end of an optical fiber is transmitted by a mirror 13 to an objective lens 12 which applies it to a sheet of photosensitive paper 110 which moves in the direction shown by the arrow 15.

The functioning of the receiving arrangement will now be explained with reference to FIGS. 6 and 7. The light beam emitted by the fiber at successive instants under the action of the electrical signal transmitted at the same moment by the line 138 (FIG. 7) is transmitted by the optical arrangement consisting of mirror 13 and objective lens 12 on to photosensitive paper 110. Successive light rays, projecting on to the screen the letters ABC, the real images of the elements of letters, are transmitted by the optical arrangement 13–12 to the photosensitive paper 110. It can be seen that a part of the message 11b imprints on the photosensitive paper 110 a line 11.

Figure 8:
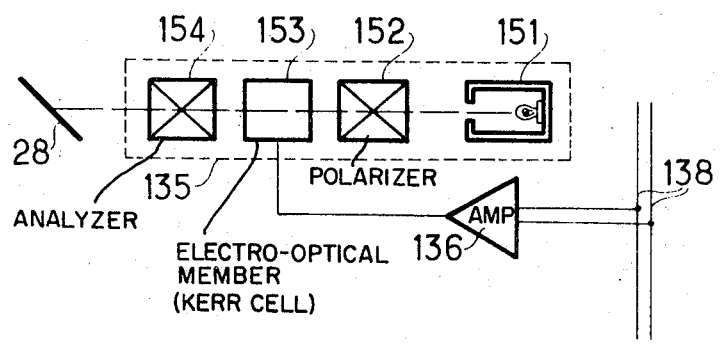
FIG. 8 is a schematic block diagram of one embodiment of a light modulating device which may be used in the device of FIG. 7.

In FIG. 8, an amplifier 136 is connected to a transmission line 138. A light source 151 sends a light beam to the mirror 28 across an optical device comprising polarizer 152, an electro-optical member 153, and an analyzer 154. The electro-optical member 153, a Kerr cell or a Pockel cell, rotates the plane of polarization of a polarized light as a function of a voltage applied to its terminals. For a certain value of this voltage the polarization plane does not rotate, and the light is transmitted between the parallel polarizer and analyzer. For a sufficiently high voltage, the cell 153 rotates the polarization plane in such a way that the light is strongly attenuated. However, other types of light-modulating arrangements may also be used for this purpose.

For a suitable dimension of the apparatus according to the invention, the length of a line will be traced on the photosensitive paper for a certain arc, for example 45°, swept by an optical fiber. With eight optical fibers and equidistant spacing thereof, eight lines will therefore be traced on the photosensitive paper for one revolution of the support.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. Facsimile apparatus for use in connection with an electrical transmission link comprising:
   first and second stations at which images may be formed;
   optical means including a lens provided in the form of an uncorrected wide-angle objective lens capable of forming either a cylindrical image at said second station from a planar image at said first station or a planar image at said first station from a cylindrical image at said second station, for transmitting images between said first and second stations;
   an electro-optical transducer;
   at least one optical fiber for transmitting light between said second station and said electro-optical transducer; and
   mechanical means for rotating said optical fiber in a plane about an axis so as to move one end thereof successively past said second station in optical communication therewith, the other end of said optical fiber being positioned on said axis of rotation in optical communication with said transducer.

2. Facsimile apparatus as defined in claim 1 wherein said first station is disposed transversely to said second station and the axis of said lens is transverse to said first station, said optical means further including a first plane mirror inclined to the axis of said lens and positioned in the light transmission path between said lens and said second station.

3. Facsimile apparatus as defined in claim 1 wherein said electro-optical transducer is a photodetector for converting a light image into an electrical signal.

4. Facsimile apparatus as defined in claim 1 wherein said electro-optical transducer is provided as a light modulator including a Kerr cell positioned between a light source and said other end of said optical fiber.

5. Facsimile apparatus as defined in claim 1 wherein said optical fiber is mounted in a rotary member in the form of a disc having a central core within which said other end of said optical fiber is positioned, said electro-optical transducer being positioned in an opaque enclosure connected to said core by light trap means for preventing light from passing said connection.

6. Facsimile apparatus as defined in claim 5 wherein said light trap means is formed by engaging projections and grooves in the respective parts of said connection forming a serpentine path.

7. Facsimile apparatus as defined in claim 1 wherein said optical fiber is carried by a rotary member in the form of a disc driven by said mechanical means and formed of a core member whose axis coincides with said axis of rotation, an annular leg portion about said core member and a flange portion at the circumference of said leg portion parallel to said axis.

8. Facsimile apparatus as defined in claim 7 wherein said one end of said optical fiber is positioned in said flange portion and faces said axis, and said other end of said optical fiber is positioned in said core member.

9. Facsimile apparatus as defined in claim 8, wherein a plurality of optical fibers are carried by said disc, one end of each of said optical fibers being positioned in said flange portion and facing said axis, the other end of each optical fiber terminating at a common point in said core member, said fibers being angularly equally spaced in said disc.

10 Facsimile apparatus as defined in claim 1 wherein a plurality of optical fibers are disposed in said plane of rotation at equal angles about said axis of rotation and being moved as a unit by said mechanical means.

11. Facsimile apparatus as defined in claim 10 wherein a movable carrier means is provided at said first station including means for effecting movement thereof at a rate proportional to the speed of rotation and number of said optical fibers.

12. Facsimile apparatus as defined in claim 11 wherein said electro-optical transducer is a photomultiplier and said carrier means carries an object illuminated by a light source to provide an image to be detected.

13. Facsimile apparatus as defined in claim 11 wherein said electro-optical transducer is light modulator means responsive to an electrical signal for providing a light image to be detected and said carrier means carries photosensitive paper.

14. Facsimile apparatus for use in connection with an electrical transmission link comprising first and second stations at which images may be formed, optical means for transmitting images between said first and second stations, an electro-optical transducer, at least one optical fiber for transmitting light between said second station and said electro-optical transducer, and mechanical means for rotating said optical fiber in a plane about an axis so as to move one end thereof successively past said second station in optical communication therewith, the other end of said optical fiber being positioned on said axis of rotation in optical communication with said transducer, wherein said second station is defined by adjustable screen means for defining a cylindrical space adjacent the path of said one end of said optical fiber.

15. Facsimile apparatus as defined in claim 14 wherein said screen means includes first and second cylindrical screens mounted in respective first and second cylindrical guides defining therebetween the angular range of the cylindrical zone forming said second station.

16. Facsimile apparatus as defined in claim 15 wherein said first station is disposed transversely to said second station and the axis of said lens is transverse to said first station, said optical means further including a first plane mirror inclined to the axis of said lens and positioned in the light transmission path between said lens and said second station.

17. Facsimile apparatus as defined in claim 16 wherein said first and second guides and said first plane mirror are mounted between the legs of a common U-shaped support member, said first plane mirror being mounted for pivotal adjustment.